(12) United States Patent
Masuda

(10) Patent No.: US 9,732,814 B2
(45) Date of Patent: Aug. 15, 2017

(54) ELECTRIC BRAKE DEVICE

(71) Applicant: NTN CORPORATION, Osaka (JP)

(72) Inventor: Yui Masuda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/894,539

(22) PCT Filed: Jun. 6, 2014

(86) PCT No.: PCT/JP2014/065068
§ 371 (c)(1),
(2) Date: Nov. 30, 2015

(87) PCT Pub. No.: WO2014/199912
PCT Pub. Date: Dec. 18, 2014

(65) Prior Publication Data
US 2016/0123419 A1    May 5, 2016

(30) Foreign Application Priority Data

Jun. 11, 2013  (JP) .................................. 2013-122370

(51) Int. Cl.
*F16D 65/18*  (2006.01)
*B60T 13/74*  (2006.01)
(Continued)

(52) U.S. Cl.
CPC ............ *F16D 65/18* (2013.01); *B60T 13/741* (2013.01); *F16D 55/225* (2013.01);
(Continued)

(58) Field of Classification Search
CPC ...... F16D 65/18; F16D 55/225; F16D 55/226; F16D 2121/24; F16D 2125/40; F16D 2125/50; B60T 13/741
(Continued)

(56) References Cited

U.S. PATENT DOCUMENTS 6,033,041 A    3/2000  Koga et al.
2005/0082122 A1  4/2005  Taylor et al.
(Continued)

FOREIGN PATENT DOCUMENTS

CN    1609738    4/2005
CN    101233031    7/2008
(Continued)

OTHER PUBLICATIONS

International Search Report issued Aug. 26, 2014 in International (PCT) Application No. PCT/JP2014/065068.
(Continued)

*Primary Examiner* — Melanie Torres Williams
(74) *Attorney, Agent, or Firm* — Wenderoth, Lind & Ponack, L.L.P.

(57) ABSTRACT

A brake device includes a control device which performs feedback control using a braking force of a linear motion mechanism as a controlled variable. The control device includes a computing unit for computing an operating quantity (voltage applied to an electric motor) for canceling out fluctuations in braking force, and a frequency detector for detecting the frequency of the operating quantity. The control device further includes an operating quantity limiting unit which limits the operating quantity according to a predetermined parameter when the detected frequency is higher than a predetermined frequency threshold (i.e. when the detected frequency is in a high-frequency range in which the permissible value of the braking force fluctuations is high). Thus, it is possible to reduce the output of the electric motor within a range in which the braking force fluctuations does not exceed the permissible value, thereby reducing the power consumption.

15 Claims, 4 Drawing Sheets

(51) Int. Cl.
 *F16D 55/226* (2006.01)
 *F16D 65/12* (2006.01)
 *F16D 55/225* (2006.01)
 *F16D 121/24* (2012.01)
 *F16D 125/40* (2012.01)
 *F16D 125/50* (2012.01)

(52) U.S. Cl.
 CPC ........... *F16D 55/226* (2013.01); *F16D 65/12* (2013.01); *F16D 2121/24* (2013.01); *F16D 2125/40* (2013.01); *F16D 2125/50* (2013.01)

(58) Field of Classification Search
 USPC .............................................. 188/72.7, 72.8
 See application file for complete search history.

(56) References Cited

U.S. PATENT DOCUMENTS

| | | |
|---|---|---|
| 2008/0110704 A1 | 5/2008 | Nakazeki |
| 2008/0217121 A1 | 9/2008 | Cao et al. |
| 2010/0253137 A1 | 10/2010 | Matsuzaki et al. |
| 2012/0285777 A1 | 11/2012 | Oshio et al. |
| 2013/0325240 A1 | 12/2013 | Ozaki |
| 2015/0151727 A1 | 6/2015 | Yasui et al. |

FOREIGN PATENT DOCUMENTS

| | | | | |
|---|---|---|---|---|
| EP | 2 444 686 | 4/2012 | | |
| JP | 06-327190 | 11/1994 | | |
| JP | 2000-283193 | 10/2000 | | |
| JP | 2005-306222 | 11/2005 | | |
| JP | 2006-194356 | 7/2006 | | |
| JP | 2010-241171 | 10/2010 | | |
| JP | 2011-173521 | 9/2011 | | |
| JP | WO 2011105512 A1 * | 9/2011 | ................ | B60T 8/00 |
| JP | WO 2011162328 A1 * | 12/2011 | ................ | H02P 3/22 |
| JP | 2013-133002 | 7/2013 | | |
| WO | 2012/114898 | 8/2016 | | |

OTHER PUBLICATIONS

Written Opinion of the International Searching Authority issued Aug. 26, 2014 in International (PCT) Application No. PCT/JP2014/065068 (with English translation).

Extended European Search Report issued Nov. 15, 2016 in corresponding European Application No. 14810132.2.

Office Action issued Jun. 16, 2017 in Chinese Application No. 201480032856.5, with machine translation.

* cited by examiner (a)

(b)

ELECTRIC BRAKE DEVICE

TECHNICAL FIELD

The present invention relates to an electric brake device which converts the rotary motion of an electric motor to a linear motion by means of a linear motion mechanism and generates the linear motion as a braking force.

BACKGROUND ART

While old automotive brake devices are mostly hydraulic ones, with an introduction of sophisticated brake control systems such as anti-lock brake control systems (ABS's), electric brake devices, which permit such sophisticated brake control without the need for complicated hydraulic circuits, are gathering attention these days. Such an electric brake device includes an electric linear motion actuator including a linear motion mechanism for converting the rotary motion of an electric motor to a linear motion of a brake pad, whereby when the electric motor is actuated by e.g. a signal indicative of the depression of the brake pedal, the brake pad is moved linearly and pressed against a brake disk, thereby applying a braking force to the wheel (see, for example, the below-identified Patent documents 1 and 2).
Patent document 1: JP Patent Publication 6-327190A
Patent document 2: JP Patent Publication 2006-194356A In such an electric brake device, since the output of the electric motor is a product of the torque and the number of revolutions of the motor, the output of the electric motor is zero while the braking force is maintained. However, while the braking force is changing, the electric motor generates an output in proportion to the number of revolutions of the motor, so that the motor consumes electric power.

Thus, any fluctuations in braking force due to external factors such as electric signal noises, quantizing noises, or uneven wear of the brake pads could cause the electric motor to oscillate at high speed, and increase its operating frequency, thereby markedly increasing the power consumption.

Accordingly, an object of the present invention is to reduce the power consumption of such an electric brake device, while reducing fluctuations in braking force of the brake device to within a permissible range.

SUMMARY OF THE INVENTION

In order to achieve the object, the present invention provides an electric brake device comprising an electric motor, a linear motion mechanism configured to convert a rotary motion of the electric motor to a linear motion and output the linear motion, and a control device for controlling a braking force generated by the linear motion mechanism. The control device is configured to detect the frequency of one of a control command value, an operating quantity and a controlled variable, and to limit the operating quantity according to a predetermined parameter if the frequency is higher than a predetermined frequency threshold value.

In particular, the inventor of the present application discovered that if the frequency of the braking force fluctuations in the electric brake device is higher than a certain value, the object to be braked is less likely to be affected by the braking force fluctuations (in other words, the permissible range of braking force fluctuations increases). Based on this discovery, according to the present invention, the operating quantity for cancelling out the braking force fluctuations is limited while the frequency of the braking force fluctuations is in a range higher than a frequency threshold value. With this arrangement, it is possible to reduce the output of the electric motor and thus reduce its power consumption, within a range in which the braking force fluctuations are not higher than a permissible value.

If the frequency of the braking force fluctuations is in a range higher than the above-mentioned certain value, the higher this frequency, the higher the permissible braking force fluctuations. Thus, in the above arrangement, the control device is preferably configured to adjust the value of the parameter such that the higher the frequency, the smaller value the operating quantity is limited to, thereby further effectively reducing the power consumption.

If the object to be braked is a wheel of a vehicle, the control device is preferably configured to adjust the value of the parameter based on the relationship between the frequency of the controlled variable and the attenuation factor of acceleration of the vehicle in the fore-and-aft direction of the vehicle, thereby more reliably reduce the influence of the braking force fluctuations on the behavior of the vehicle.

Specific arrangements for limiting the operating quantity include: using, as the parameter, upper and lower limit values of the operating quantity; subtracting the product of a gain as the parameter and the difference between the frequency as detected and the frequency threshold value, from the operating quantity; and providing, as the parameter, a dead band corresponding to a deviation between the control command value and the controlled variable.

Also, the control device may be configured to perform feedback control using the braking force generated by the linear motion mechanism as the controlled variable, and a braking force target value as the control command value, or using, as the controlled variable, one of an electric current applied to the electric motor and the rotational angle of the electric motor, as the control command value, a value obtained by converting the braking force target value based on a predetermined conversion coefficient, and as the operating quantity, a voltage applied to the electric motor.

ADVANTAGES OF THE INVENTION

As described above, utilizing a phenomenon in which if the frequency of the braking force fluctuations in the electric brake device is higher than a certain value, the object to be braked is less likely to be affected by the braking force fluctuations (in other words, the permissible range of braking force fluctuations increases), the electric brake device according to the present invention is configured such that the operating quantity for cancelling out the braking force fluctuations is limited while the frequency of the braking force fluctuations is high. It is therefore possible to reduce the power consumption, while reducing fluctuations in braking force.

DETAILED DESCRIPTION OF THE INVENTION

Figure 1:
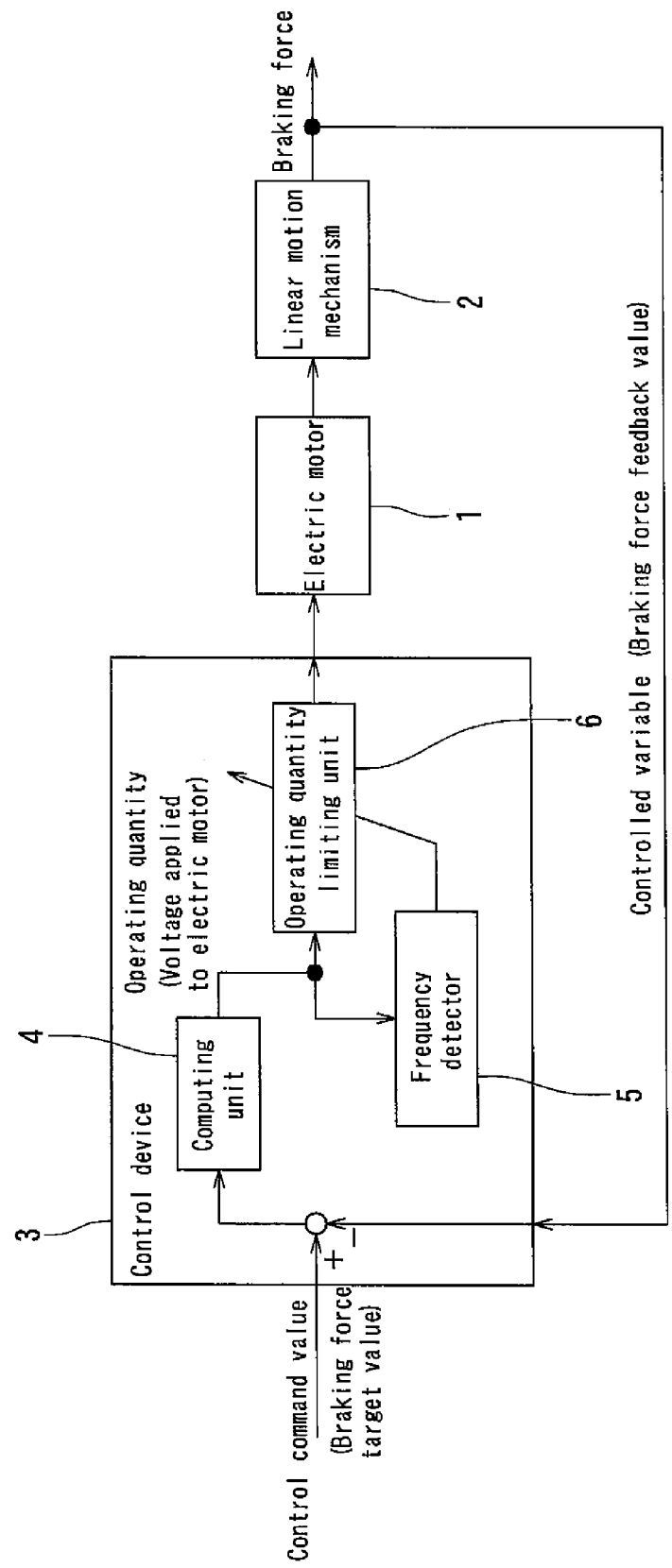
FIG. 1 shows the entire structure of an electric brake device embodying the present invention.

Now the embodiment of the present invention is described with reference to the drawings. FIG. 1 shows the entire electric brake device of the embodiment. This electric brake device includes an electric motor 1, a linear motion mechanism 2 for converting the rotary motion of the electric motor 1 to a linear motion and outputting the linear motion as a braking force, and a control device 3 for controlling the braking force generated by the linear motion mechanism 2.

Figure 2:
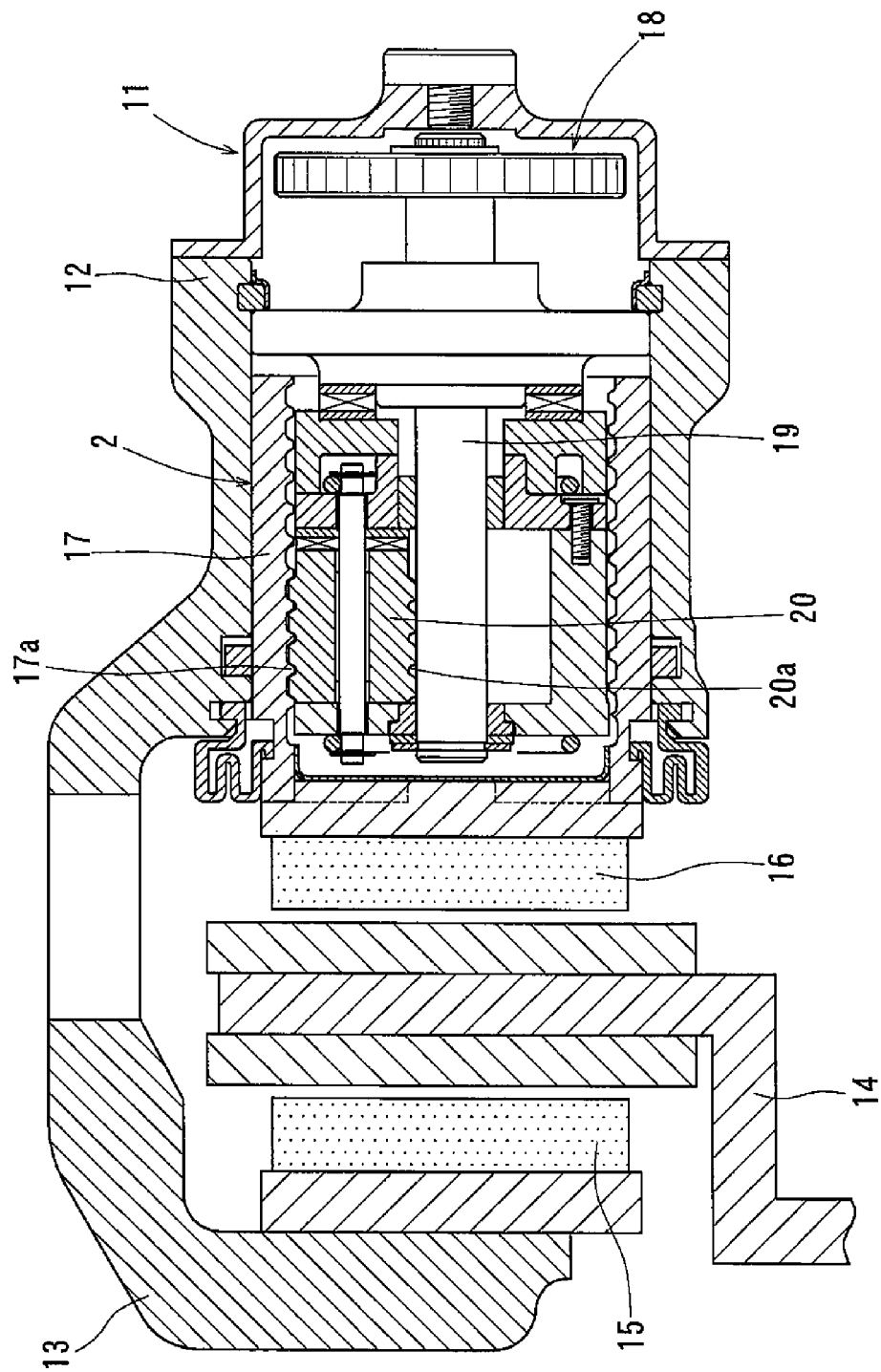
FIG. 2 is a vertical sectional front view of a mechanical portion of the electric brake device of FIG. 1.

As shown in FIG. 2, the mechanical portion of the electric brake device includes an electric linear motion actuator 11 including the electric motor 1 and the linear motion mechanism 2, and further including a housing, a caliper body 13 integral with the housing 12, a brake disk 14 of which the outer peripheral portion is partially disposed within the caliper body 13, and brake pads 15 and 16 disposed on the respective sides of the brake disk 14.

The electric linear motion actuator 11 includes a gear reduction mechanism 18 through which the rotation of the rotor shaft of the electric motor 1 is transmitted to a rotary shaft 19, and is configured to convert the rotary motion of the rotary shaft 19 to a linear motion of an outer ring member 17 by means of the linear motion mechanism 2. The linear motion mechanism 2 includes a plurality of planetary rollers 20 mounted between the rotary shaft 19 and the outer ring member 17 such that when the rotary shaft 19 rotates, the planetary rollers 20 are rotated about their respective axes while rotating around the rotary shaft 19, due to elastic contact between the planetary rollers 20 and the radially outer surface of the rotary shaft 19, thereby moving the outer ring member 17 in the axial direction due to engagement of a helical rib 17a formed on the radially inner surface of the outer ring member 17 in helical grooves 20a formed in the radially outer surfaces of the respective planetary rollers 20.

In this arrangement, when the electric motor 1 of the electric linear motion actuator 11 is driven to linearly move the outer ring member 17 in the direction toward the brake disk 14 by means of the linear motion mechanism 2, the brake pad 16 and the brake pad 15 clamp the brake disk 14 therebetween, thereby applying a braking force to the vehicle wheel to which the brake disk 14 is mounted.

As shown in FIG. 1, the control device 3 is configured to perform feedback control using the braking force generated by the linear motion mechanism 2 as a controlled variable, and to receive a braking force target value as a control command value, and the controlled variable (braking force feedback value), and includes a computing unit 4 for calculating an operating quantity (voltage to be applied to the electric motor 1) for canceling the deviation between the target value and the feedback value, a frequency detector 5 for detecting the frequency $f_0$ of the operating quantity calculated by the computing unit 4, and an operating quantity limiting unit 6 for limiting the operating quantity based on the frequency detected by the frequency detector 5. The control device 3 applies the operating quantity to the electric motor 1 after being limited by the operating quantity limiting unit 6.

Figure 3:
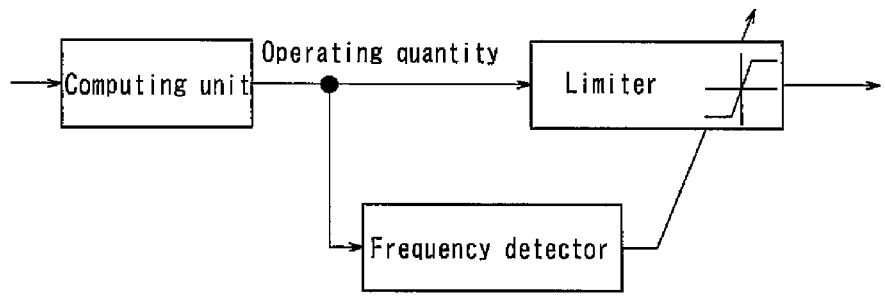
FIG. 3 shows a partial structure of an electric brake device in which a limiter is used as an operating quantity limiting unit of a control device of FIG. 1.

FIG. 3 shows, as the operating quantity limiting unit 6 of the control device 3, a limiter configured to limit the operating quantity within a predetermined range while the frequency $f_0$ of the operating quantity as detected by the frequency detector 5 is higher than a predetermined frequency threshold value $f_{th}$.

Figure 4:
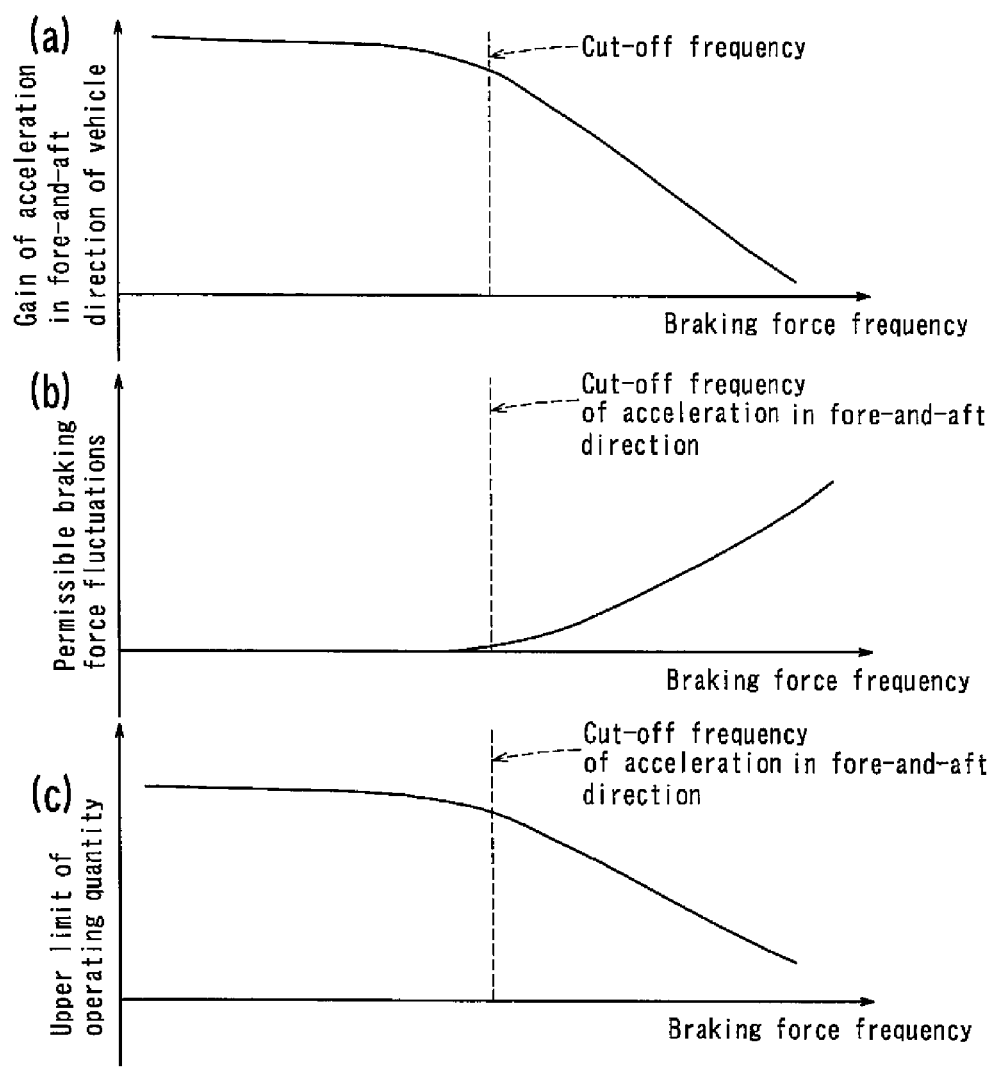
FIGS. 4($a$) to 4($c$) are graphs showing the upper limit of the operating quantity according to the frequency of fluctuations in braking force.

In this limiter (operating quantity limiting unit 6), the upper and lower limit values of the operating quantity (i.e. the parameters that limit the operating quantity) are values variable with the frequency $f_0$ of the operating quantity. Now referring to FIGS. 4(a) to 4(c), it is described how the upper limit of the operating quantity is determined. Generally speaking, while a braking force is applied to wheels of a vehicle, the acceleration of the vehicle in its fore-and-aft direction tends to attenuate with an increase in the frequency of the braking force if the frequency is higher than a certain frequency (cut-off frequency), as shown in FIG. 4(a). In particular, within the high frequency range of the braking force, the higher the frequency, the less likely the vehicle behavior is to be influenced by the fluctuations in braking force, and thus larger braking force fluctuations are permissible (as shown in FIG. 4(b)). This makes it possible to limit the operating quantity to a smaller value, and thus to reduce its upper limit value (as shown in FIG. 4(c)).

Therefore, it is preferable to store beforehand permissible values according to the frequencies of the braking force which are determined based on the relationship between the frequency of the braking force and the attenuation factor of the vehicle acceleration in the fore-and-aft direction of the vehicle, and to determine the upper limit of the operating quantity based on the frequency $f_0$ of the operating quantity, which corresponds to the frequency of the braking force such that the braking force fluctuations do not exceed the permissible value, while the frequency $f_0$ is higher than a frequency threshold value $f_{th}$ which is determined based on the frequency characteristics of the acceleration in the fore-and-aft direction. The lower limit of the operating quantity is a negative value identical in absolute value to the upper limit of the operating quantity. With this arrangement, it is possible to limit the operating quantity to a lower value with an increase in the frequency $f_0$.

Figure 5:
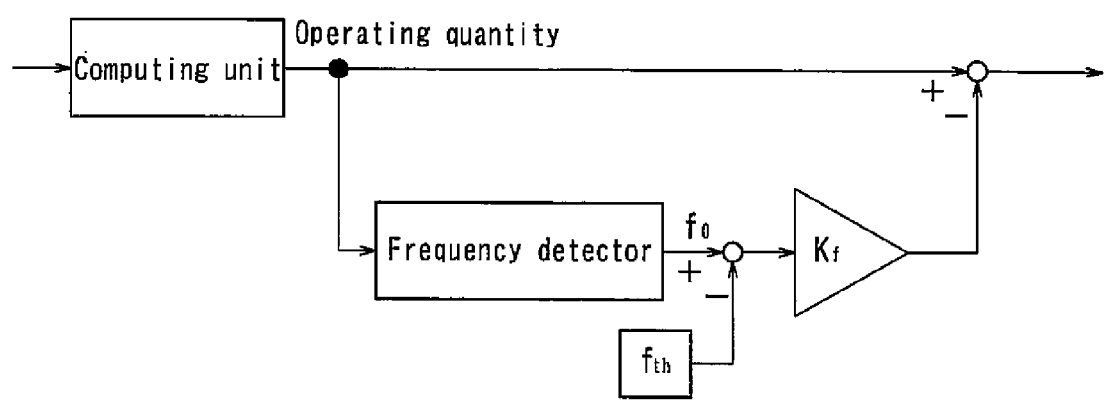
FIGS. 5(a) and 5(b) show partial structures of electric brake devices in which different operating quantity limiting arrangements are used in the respective control devices in FIG. 2.
Figure 5:
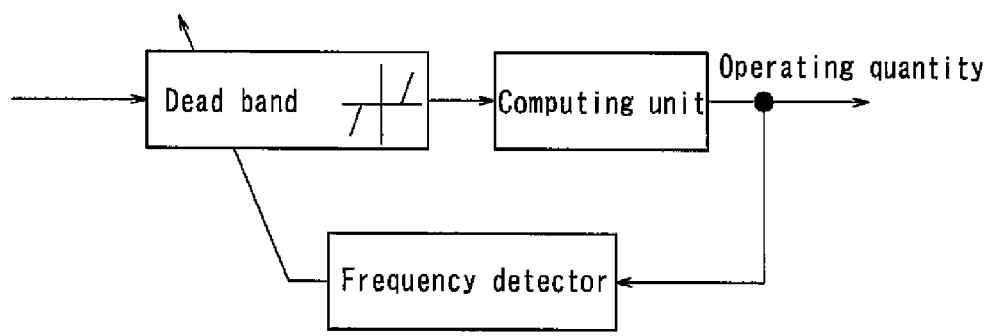

In order to limit the operating quantity, instead of using the above-described limiter, the control device 3 may be configured as shown in FIGS. 5(a) and 5(b). In the configuration of FIG. 5(a), the control device 3 includes a gain $K_f$ as a parameter for limiting the operating quantity, and is configured to subtract the product of the gain $K_f$ and the difference between the frequency $f_0$ of the operating quantity and the frequency threshold value $f_{th}$, from the operating quantity. In the configuration of FIG. 5(b), the control device 3 includes, as the parameter for limiting the operating quantity, a dead band corresponding to the deviation between the control command value (control target value) and the controlled variable (braking force feedback value).

If the configuration shown in FIG. 5(a) or 5(b) is used to limit the operating quantity, too, the gain $K_f$ or the dead band, as the parameter for limiting the operating quantity, may be adjusted as a value variable with the frequency $f_0$ of the operating quantity such that the higher the frequency $f_0$, the smaller the operating quantity, as with the upper and lower limit values of the operating quantity in the example of FIG. 3.

Since this electric brake device is configured to limit the operating quantity for canceling the braking force fluctuations according to the predetermined parameter while the frequency $f_0$ of the operating quantity is higher than the frequency threshold value $f_{th}$ corresponding to the cut-off frequency of the acceleration of the vehicle in the fore-and-aft direction, it is possible to reduce the output of the electric motor 1 within the range in which the braking force fluctuations do not exceed the permissible value, i.e. do not affect the vehicle behavior, thereby reducing the power consumption.

The parameter for limiting the operating quantity may be a fixed value, but is preferably a variable value adjustable such that the operating quantity is limited to a smaller value with an increase in frequency, as in the above embodiments, because with this arrangement, it is possible to more effectively reduce the power consumption.

In any of the above embodiments, the frequency detector 5 is configured to detect the frequency $f_0$ of the operating quantity, but may be configured to detect the frequency of the control command value or of the controlled variable.

In the embodiments, the control device 3 is configured to perform feedback control using the braking force generated by the linear motion mechanism 2 as the controlled variable, and the braking force target value as the control command value. However, the control device 3 may be configured to perform feedback control using, as the controlled variable, a state quantity such as the current or rotational angle of the electric motor 1, or the displacement of the movable brake pad 16, and, as the control command value, a value obtained by converting the braking force target value based on a predetermined conversion coefficient so as to correspond to the control variable. Alternatively, feed-forward control may be performed based on the characteristics of the actuator stored beforehand (such as inertia moment, torque or reduction ratio).

The linear motion mechanism 2 may comprise, instead of the planetary roller-screw mechanism used in the embodiments, a ball-screw mechanism or a ball-ramp mechanism.

DESCRIPTION OF THE NUMERALS

1. Electric motor
2. Linear motion mechanism
3. Control device
4. Computing unit
5. Frequency detector
6. Operating quantity limiting unit
11. Electric linear motion actuator
12. Housing
13. Caliper body
14. Brake disk
15, 16. Brake pad
17. Outer ring member
18. Gear reduction mechanism
19. Rotary shaft
20. Planetary roller

What is claimed is:

1. An electric brake device comprising:
   an electric motor,
   a linear motion mechanism configured to convert a rotary motion of the electric motor to a linear motion and to output the linear motion, and
   a control device configured to control a braking force generated by the linear motion mechanism,
   wherein the control device is configured to detect a frequency value of one of a control command value, an operating quantity, and a controlled variable, and is configured to limit the operating quantity according to a predetermined parameter if the detected frequency value is higher than a predetermined frequency threshold value, and
   wherein the control device is configured to adjust a value of the predetermined parameter such that, the higher the frequency value, the smaller a value that the operating quantity is limited to.

2. The electric brake device of claim 1, wherein the electric brake device is arranged in such a manner that the braking force is applied to a wheel of a vehicle, and wherein the control device is configured to adjust the value of the predetermined parameter based on a relationship between the frequency of the controlled variable and an attenuation factor of acceleration of the vehicle in a fore-and-aft direction of the vehicle.

3. The electric brake device of claim 1, wherein the operating quantity is limited by using, as the predetermined parameter, upper and lower limit values of the operating quantity.

4. The electric brake device of claim 2, wherein the operating quantity is limited by using, as the predetermined parameter, upper and lower limit values of the operating quantity.

5. The electric brake device of claim 1, wherein the operating quantity is limited by subtracting a product of a gain as the predetermined parameter and a difference between the frequency as detected and the frequency threshold value, from the operating quantity.

6. The electric brake device of claim 2, wherein the operating quantity is limited by subtracting a product of a gain as the predetermined parameter and a difference between the frequency as detected and the frequency threshold value, from the operating quantity.

7. The electric brake device of claim 1, wherein the operating quantity is limited by providing, as the predetermined parameter, a dead band corresponding to a deviation between the control command value and the controlled variable.

8. The electric brake device of claim 2, wherein the operating quantity is limited by providing, as the predetermined parameter, a dead band corresponding to a deviation between the control command value and the controlled variable.

9. The electric brake device of claim 1, wherein the control device is configured to perform feedback control using the braking force generated by the linear motion mechanism as the controlled variable, and a braking force target value as the control command value, or using: as the controlled variable, one of an electric current applied to the electric motor and a rotational angle of the electric motor; as the control command value, a value obtained by converting the braking force target value based on a predetermined conversion coefficient; and as the operating quantity, a voltage applied to the electric motor.

10. The electric brake device of claim 2, wherein the control device is configured to perform feedback control using the braking force generated by the linear motion mechanism as the controlled variable, and a braking force target value as the control command value, or using: as the controlled variable, one of an electric current applied to the electric motor and a rotational angle of the electric motor; as the control command value, a value obtained by converting the braking force target value based on a predetermined conversion coefficient; and as the operating quantity, a voltage applied to the electric motor.

11. An electric brake device comprising:
    an electric motor,
    a linear motion mechanism configured to convert a rotary motion of the electric motor to a linear motion and to output the linear motion, and a control device configured to control a braking force generated by the linear motion mechanism, wherein the control device is configured to detect a frequency value of one of a control command value, an operating quantity, and a controlled variable, and is configured to limit the operating quantity according to a predetermined parameter if the detected frequency value is higher than a predetermined frequency threshold value, and wherein the operating quantity is limited by subtracting a product of a gain as the predetermined parameter and a difference between the frequency as detected and the frequency threshold value, from the operating quantity.

12. The electric brake device of claim 11, wherein the control device is configured to perform feedback control using the braking force generated by the linear motion mechanism as the controlled variable, and a braking force target value as the control command value, or using: as the controlled variable, one of an electric current applied to the electric motor and a rotational angle of the electric motor; as the control command value, a value obtained by converting the braking force target value based on a predetermined conversion coefficient; and as the operating quantity, a voltage applied to the electric motor.

13. An electric brake device comprising:
an electric motor,
a linear motion mechanism configured to convert a rotary motion of the electric motor to a linear motion and to output the linear motion, and
a control device configured to control a braking force generated by the linear motion mechanism,
wherein the control device is configured to detect a frequency value of one of a control command value, an operating quantity, and a controlled variable, and is configured to limit the operating quantity according to a predetermined parameter if the detected frequency value is higher than a predetermined frequency threshold value, and
wherein the operating quantity is limited by providing, as the predetermined parameter, a dead band corresponding to a deviation between the control command value and the controlled variable.

14. The electric brake device of claim 13, wherein the control device is configured to perform feedback control using the braking force generated by the linear motion mechanism as the controlled variable, and a braking force target value as the control command value, or using: as the controlled variable, one of an electric current applied to the electric motor and a rotational angle of the electric motor; as the control command value, a value obtained by converting the braking force target value based on a predetermined conversion coefficient; and as the operating quantity, a voltage applied to the electric motor.

15. An electric brake device comprising:
an electric motor,
a linear motion mechanism configured to convert a rotary motion of the electric motor to a linear motion and to output the linear motion, and
a control device configured to control a braking force generated by the linear motion mechanism,
wherein the control device is configured to detect a frequency value of one of a control command value, an operating quantity, and a controlled variable, and is configured to limit the operating quantity according to a predetermined parameter if the detected frequency value is higher than a predetermined frequency threshold value, and
wherein the control device is configured to perform feedback control using the braking force generated by the linear motion mechanism as the controlled variable, and a braking force target value as the control command value, or using: as the controlled variable, one of an electric current applied to the electric motor and a rotational angle of the electric motor; as the control command value, a value obtained by converting the braking force target value based on a predetermined conversion coefficient; and as the operating quantity, a voltage applied to the electric motor.

* * * * *